UNITED STATES PATENT OFFICE.

JOHANN JAKOB BRACK, OF BASLE, SWITZERLAND, ASSIGNOR TO L. DURAND, HUGUENIN & CO., OF ST. FONS, FRANCE, BASLE, SWITZERLAND, AND HÜNINGEN, GERMANY.

DIAMIDO BASE.

SPECIFICATION forming part of Letters Patent No. 516,752, dated March 20, 1894.

Application filed December 13, 1893. Serial No. 493,591. (Specimens.) Patented in France April 6, 1892, No. 220,724; in Germany April 15, 1893, No. 72,431, and in England June 28, 1893, No. 12,704.

*To all whom it may concern:*

Be it known that I, JOHANN JAKOB BRACK, a citizen of the Swiss Republic, residing at Basle, Switzerland, have invented new and useful Improvements in the Production of New Diamido Bases, (partly patented by the firm L. Durand, Huguenin & Co, of St. Fons, near Lyons, France, Basle, Switzerland, and Hüningen, Germany, in France by Letters Patent of addition, dated April 13, 1893, to Patent No. 220,724, dated April 6, 1892; in England by Letters Patent No. 12,704, dated June 28, 1893, and in Germany by Letters Patent No. 72,431, dated April 15, 1893;) and I do hereby declare the following to be a full, clear, and exact description of the invention, such as will enable others skilled in the art to which it appertains to make and use the same.

This invention relates to the production of new unsymmetrical diamido-bases suitable for the manufacture of coloring matters dyeing unmordanted cotton in an alkaline bath by the condensation of one molecule of formaldehyde (formic-aldehyde) with one molecule of a paradiamin such as, tolidin or benzidin for example, and one molecule of the hydrochlorate of an aromatic monamido-compound, such, for instance, as orthoamidophenol or anilin.

By way of example, I will now describe the method of producing two of these new unsymmetrical diamido-bases.

I. *Production of the unsymmetrical diamido-bases derived from formaldehyde, tolidin and the hydrochlorate of anilin.*—21.2 kilos of tolidin and thirteen kilos of anilin hydrochlorate are triturated with ten kilos of alcohol to the consistence of a thick paste and then mixed with 7.5 kilos of a forty per cent. solution of formaldehyde. After standing for a short time, the mass is heated on the water bath by preference for one or two days, after which time the greater part of the anilin and tolidin employed is applied to form the new base. The product of the reaction is a tough, pitchy, pale yellowish green mass. In order to eliminate the matters which do not form part of the product of the reaction the melt is treated with diluted sulfuric acid, whereby the new base is dissolved while the tolidin and anilin sulfates which do not readily dissolve are separated by filtration. From the sulfate solution the new body is precipitated as a pale yellowish-green resinous mass which usually solidifies only in an anhydrous condition. The new base fuses at 50° to 55° centigrade, is readily soluble in hot alcohol and benzene, almost insoluble in ether, and its hydrochlorate and sulfate salts are readily soluble in water. The obtained base has apparently the formula:

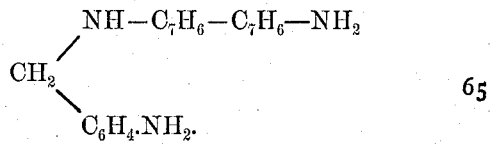

The nitrite employed for diazotizing it corresponds with the two amido-groups of the above formula: The tetrazo-compound dissolved in water, forms, for example, with naphtionic acid a red substantive cotton dye, which is dissolved in concentrated sulfuric acid with a violet red color.

II. *Production of the unsymmetrical diamido base derived from formaldehyde, tolidin and hydrochlorate of orthoamidophenol.*—The new unsymmetric diamido-base obtained by the action of a molecule of formic aldehyde on the mixture of a molecule of tolidin and a molecule of hydrochlorate of orthoamidophenol, contains, besides the two amido-groups, a further hydroxyl group, and is consequently characterized by a less pronounced basic quality. Its biacid salts are decomposed by water into basic salts; by adding an excess of water to an acid solution of this new base, it is precipitated as a basic salt. The constitution of this new base is probably represented by the formula:

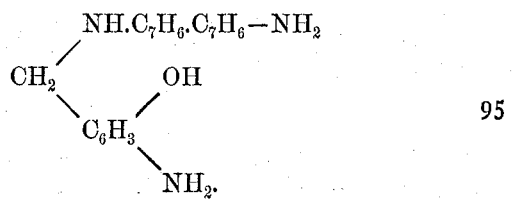

This new base is only slightly soluble in alcohol, insoluble in ether and benzene, and the aqueous acid solutions of its salts have a very pronounced green fluorescence. The new base begins to melt at 75° centigrade and, at the temperature of the water bath, it appears as a viscous resin, above 100° centigrade it decomposes. If the cold acid solution of the new base be decomposed by sodium nitrite, there is obtained a tetrazo-derivative which precipitates in brownish yellow flakes. This tetrazo-derivative forms, with naphtionic acid, for example, a red coloring matter which dyes cotton without mordant. The quantity of nitrite employed to diazotize the new base corresponds nearly with the amido-groups which appear in the formula hereinbefore presented. To prepare this new base, I operate in a manner analogous to that described in the foregoing example, that is to say: 21.2 kilos of tolidin and 14.5 kilos hydrochlorate of orthoamidophenol are triturated with alcohol to a paste to which are then added 7.5 kilos of solution of formic-aldehyde at forty per cent. The reaction immediately begins, evolving considerable heat, while the mass thickens and assumes a brick red coloration. The reaction is completed by heating for several hours on the water bath, after which almost all the tolidin and the whole of the orthoamidophenol have been utilized in the production of the new base. To eliminate from the base produced the small quantity of tolidin not acted on, the mass resulting from the fusion is treated with hot dilute sulfuric acid, so as to dissolve the greater part of the mass, after which the tolidin may be separated in the state of sulfate, by filtration. After the sulfate solution has been left to itself for several hours, a small quantity of black resin is deposited at the bottom of the vessel, and from this is separated the liquor from which, by addition of ammonia, the new diamido-base can be precipitated in the form of yellow brown flakes.

What I claim as my invention, and wish to secure by Letters Patent, is—

1. The herein described process for the production of unsymmetrical diamido-bases by the reaction under heat of one molecule of formaldehyde on a mixture of one molecule of a paradiamin and one molecule of the hydrochlorate of an aromatic monoamido-compound, as set forth.

2. The herein described process for the production of unsymmetrical diamido-bases, by the reaction under heat of one molecule of formaldehyde on a mixture of one molecule tolidin and one molecule of the hydrochlorate of an aromatic monoamido-compound, as set forth.

3. The herein described unsymmetric diamido-base suitable for the production of substantive cotton dyes derived from formaldehyde, tolidin and orthoamidophenol, which is very little soluble in alcohol, insoluble in ether and benzene, constitutes a yellow brown mass and forms salts the aqueous acid solutions of which have a very pronounced green fluorescence, as set forth.

In witness whereof I have hereunto signed my name in the presence of two subscribing witnesses.

JOHANN JAKOB BRACK.

Witnesses:
  THEODORE STACHELIN,
  GEORGE GIFFORD.